United States Patent [19]
Nelson et al.

[11] Patent Number: 5,959,986
[45] Date of Patent: Sep. 28, 1999

[54] LIGHTWAVE TRANSMISSION TELECOMMUNICATIONS SYSTEM EMPLOYING A STACKED MATRIX ARCHITECTURE

[75] Inventors: Glenn W. Nelson, Dallas; Stephen C. Carlton, Plano; Don G. Dempsey, Grapevine; Robert M. Kaminsky, McKinney, all of Tex.

[73] Assignee: Alcatel Network Systems, Inc.

[21] Appl. No.: 08/941,462

[22] Filed: Sep. 30, 1997

[51] Int. Cl.$^6$ ........................................... H04L 12/28
[52] U.S. Cl. ............................... 370/351; 370/216
[58] Field of Search ........................... 370/351, 359, 370/360, 254, 258, 216, 219, 220, 352–356, 372, 375, 376; 340/825.79, 825.8, 825.89, 827, 828; 395/180, 181, 182.01, 182.02

[56] References Cited
U.S. PATENT DOCUMENTS 4,964,095  10/1990  Tyrrell et al. ........................... 370/351
5,283,785  2/1994  Ferguson ................................. 370/351
5,416,768  5/1995  Jahromi ................................... 370/258
5,517,489  5/1996  Ogura ...................................... 370/224
5,621,383  4/1997  Yoshiyami .............................. 370/506

*Primary Examiner*—Ajit Patel
*Attorney, Agent, or Firm*—Gray Cary Ware & Freidenrich, LLP

[57] ABSTRACT

A lightwave telecommunications matrix configuration for use in a fiber-optic telecommunications network includes a first set of interface circuits for interfacing with a first external fiber-optic circuit. A second set of interface circuits interfacing with a second external fiber-optic circuit. A plurality of time slot matrices associate between the first and second sets of interface circuits for routing lightwave transmissions within the fiber-optic network. The matrix configuration is optimized for a variety of telecommunication switch architectures, including add/drop matrix, ring, and terminal configurations. Accordingly, the matrix configuration is easily scalable to a wide range of telecommunications network sizes and data rates.

7 Claims, 5 Drawing Sheets

000# LIGHTWAVE TRANSMISSION TELECOMMUNICATIONS SYSTEM EMPLOYING A STACKED MATRIX ARCHITECTURE

TECHNICAL FIELD OF THE INVENTION

The present invention relates to lightwave transmission methods and systems and, more particularly, to a lightwave transmission telecommunications system employing a stacked matrix architecture and method of operating the system.

BACKGROUND OF THE INVENTION

In fiber-optic lightwave telecommunication transmission systems there is the desire for system versatility that makes possible serving a variety of telecommunications transmission architectures such as add/drop multiplex, bidirectional line switched ring (BLSR), and terminal configurations. In known lightwave transmission systems, however, an architectures' benefits and optimal functions are generally specific to one of the three different architectures.

Lightwave transmission system networks, as a rule, are complex and must work in a variety of configurations. Because of interface limitations, lightwave transmission system architectures are often designed to be optimized for one particular configuration and are less effective in other configurations. This means, for example, that the architecture a lightwave transmission product employs may be most efficient in an add/drop multiplex configuration, but highly inefficient in both BLSR and terminal configurations. The limitation of transmission products not being adaptable to different architectures makes designing scalable transmission products difficult. This is because at various points in a network there may be all the different types of configurations. A shortcoming, therefore, results where the system operates inefficiently for the configuration with which it interfaces.

SUMMARY OF THE INVENTION

A need exists, therefore, for fiber-optic lightwave telecommunication transmission systems and related architectures that can be concurrently optimized for a variety of telecommunications transmission configurations.

The need is further compacted for a lightwave transmission system architecture that is scalable to different sized network elements (systems within a network).

According to one aspect of the invention, there is provided a lightwave telecommunications matrix configuration for use in a fiber-optic telecommunications network which includes a first set of interface circuits for interfacing with a first external fiber-optic circuit. A second set of interface circuits interface with a second external fiber-optic circuit. A plurality of time slot matrices associate between the first and second sets of interface circuits for routing transmissions data within the fiber-optic network. The matrix configuration is optimized for a variety of telecommunication switch architectures, including, but not limited to, add/drop multiplex, BLSR, and terminal configurations. Accordingly, the matrix configuration is easily scalable to a wide range of telecommunications network sizes and data rates.

The present invention provides a lightwave transmission telecommunications system that employs a stacked matrix architecture making possible a platform that grows from architectures such as add/drop multiplex, BLSR, and/or terminal configurations. This permits a network employing the present invention's architecture to grow easily and efficiently from the minimum to maximum configuration. The present invention provides; a generic, simpler system architecture with the advantages of network scalability and essentially no change in overall cost in the transmission products employing the architecture. The present invention also provides essentially the same degree of reliability as with conventional systems.

The present invention provides an improved architecture relative to systems that only focus on a subset of configuration, for example, because it is not important what interface types or functions are connected to the matrix. The only criteria that must be met for interfaces is the quantity of time slots of each interface. A matrix system should not have fewer time slots at the interface than available through the matrix. This condition is referred to as "blocking", some of the interfaces are blocked from passing through the matrix. Because the present invention uses stacked matrices, it is possible to interface to any network interface that is required for the systems, including, but not limited to, a Add-drop multiplex, terminal, and BLSR configuration. The connectivity through the system is purely a time slot connection. The matrix simply connects one path to another by connecting time slots throught the matrix(s). Accordingly, any configuration can be built through a time slot connection that goes through the system.

Another technical advantage of the present invention is that it is scalable. The present invention, for example, utilizes a building block of a small set of interface cards and matrix that allow system growth, for example, an OC-48 transmission system providing connectivity to OC-12 interface(s)and growing to an OC192 or OC768 system, without limitations to scalability associated with known configurations.

BRIEF DESCRIPTION OF THE DRAWINGS

For a more complete understanding of the present invention and the advantages thereof, reference is now made to the following description which is to be taken in conjunction with the accompanying drawings in which like reference numerals indicate like features and wherein.

DETAILED DESCRIPTION OF THE INVENTION

Preferred embodiments of the present invention are illustrated in the FIGUREs wherein like numerals refer to like and corresponding parts of the various drawings.

The present invention includes a system architecture that meets all requirements for a variety of lightwave configurations. The architecture also is very versatile and capable of upgrades to new configurations, irrespective of the interface data rates. With the present invention, a lightwave transmission system receives data on lower order interface cards at various data rates. This data is processed, groomed, switched, and passed on to higher-order interface cards for transmission into the network. The data flow is bi-directional, so the reverse flow is also processed.

Figure 1:
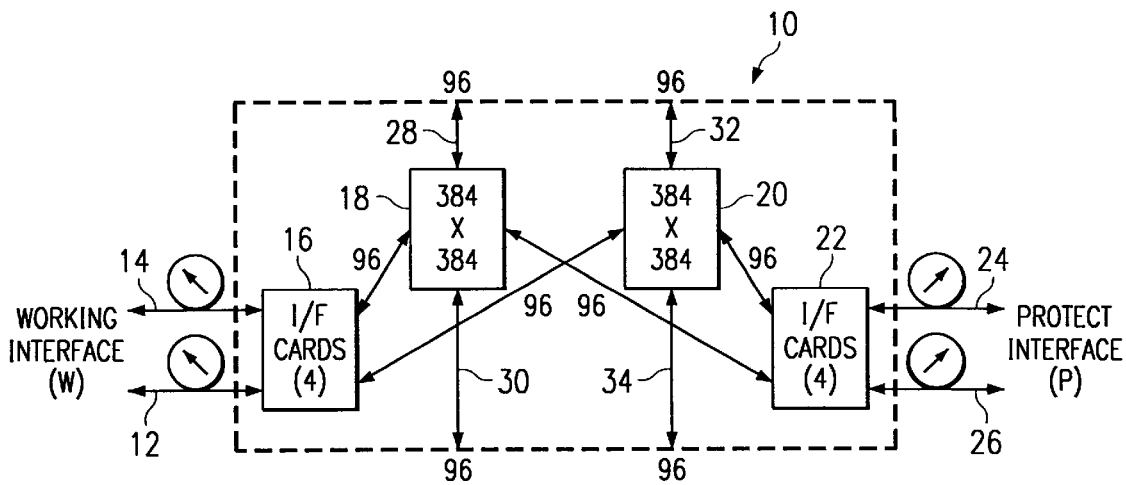
FIG. 1 illustrates a stacked-matrix building block according to the teachings of the present invention.

FIG. 1 illustrates one embodiment of the present invention as a single stacked-matrix configuration 10 for an Alcatel Network Systems transmission switch which employs the teachings of the present invention, and wherein working fiber-optic line(s) 14, for example, feed into working interface card(s) 16 using a pair of fiber connections. From each working interface card(s) 16, 48 time slots connect to the working 384×384 matrix 18, while another 48 time slots connect to the protect 384×384 matrix 20. These connections are bidirectional, so that 48 time slots connect from the working 384×384 matrix 18 to each of the working interface card(s)16, likewise the protect 384×384 matrix 20 connects 48 time slots to the each of the working interface card(s) 16. From protect interface card(s) 22, 48 time slots connect to the working 384×384 matrix 18, while another 48 lines connect to the protect 384×384 matrix 20. These connections are bidirectional, so that 48 time slots connect from the working 384×384 matrix 18 to each of the protect interface card(s) 22, likewise the protect 384×384 matrix 20 connects 48 time slots to each of the protect interface card(s) 22. The protect interface card(s) 22 provide protect fiber-optic line(s) 24. Interface cards 16 and 22 represent four card slots working and four card slots protect, each with the ability to house an; OC768, OC192, OC48, OC12, OC3, STS1, and DS3 interface card(s). The OC768 and OC192 interface cards occupy four card slots each. From the 384×384 matrix 18, 96 time slots 28 may go to the shelf above, while 96 time slots 30 may go to the shelf below of the stacked-matrix 10 architecture. Likewise, from the 384×384 matrix 20, 96 time slots 32 may connect to the shelf above, while 96 lines 34 may connect to the shelf below of the stacked-matrix 10 architecture. These data connections are also bidirectional.

The present invention uses single 384×384 time-slot matrices 18 and 20 to interface between interface card(s) 16 and 22 so that all processing is accomplished in a singular matrix configuration 10, providing all of the required switching functions for the connected interface cards 16 and 22. Additional matrix(s) configurations and interface card(s) may be stacked above and below 10 with the bi-directional data bus between them to increase the system level capacity. This architecture allows the system to grow indefinitely without deterring from the functionality of the first installed shelf(s).

The stacked matrix architecture 10 of the present invention permits virtual non-blocking switching to all of the available interface card(s) 16 and 22 traffic on the shelf in both the inbound and outbound directions. The above-matrix bi-directional traffic connectivity can carry half of the capacity of the resident traffic, while the below-matrix bi-directional traffic connectivity can also carry half of the resident interface traffic. The matrix traffic also has the ability to pass through the matrix from below to above matrix configuration 10 unrestricted. The matrix traffic, likewise, can pass from above to below the stacked matrix configuration 10 unrestricted.

The 384×384 matrices 18 and 20 of the present invention, are blocking matrices. Thus, there are 384 inputs and 384 outputs, but it may not be possible to connect all inputs to all outputs. However, with the present invention, this limitation is not material, because non-blocking is not required for the purposes of the present invention.

Figure 2:
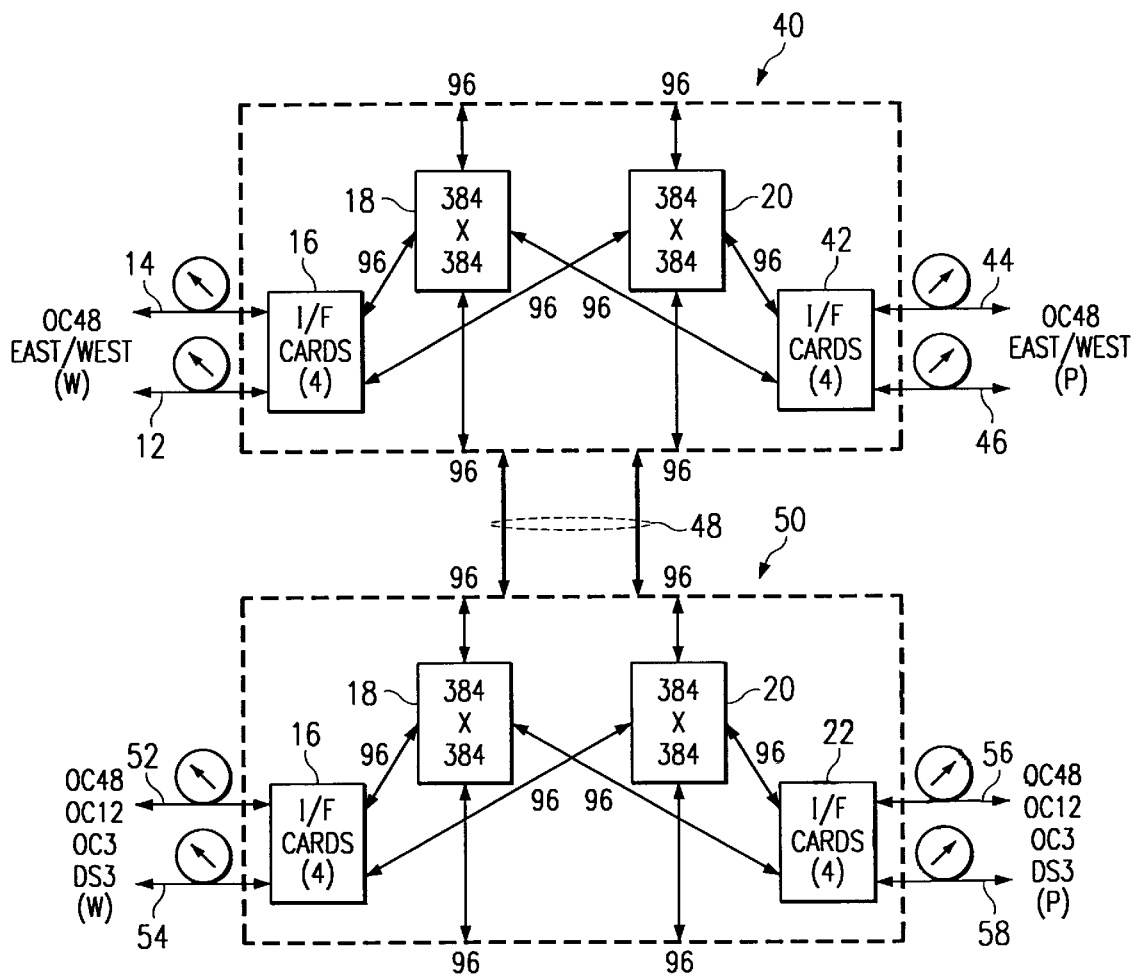
FIG. 2 illustrates the ability of the present invention to connect stacked matrices with from high-speed interfaces to additional high-speed interfaces or to low-speed interfaces.

FIG. 2 more particularly illustrates the stacking feature of the present invention. Suppose, for example, matrix configuration 40, which receives 48 input time slots from 384×384 matrix 18 and 384×384 matrix 20 providing OC-48 working lines 12 and 14 and protect lines 44 and 46. This configuration 40 realizes a 4BLSR configuration. Matrix configuration 40 may stack, as arrows 48 indicate below matrix configuration 50 which may receive, for example, OC-12, OC-3, or DS-3 working input 52 and 54 with protect input 56 and 58. As in matrix configurations 10 and 40, matrix configuration 50 includes interface card(s) 16 and 22, 384×384 matrices 18 and 20.

FIG. 2 illustrates the ability to connect from high-speed interfaces down to additional high-speed interfaces or low-speed interfaces. It illustrates the ability to change the interface card types to any desired connection type. Examples of such connections, for instance, would be an OC-48, an OC-12, an OC-3 and/or a DS3.

Figure 3:
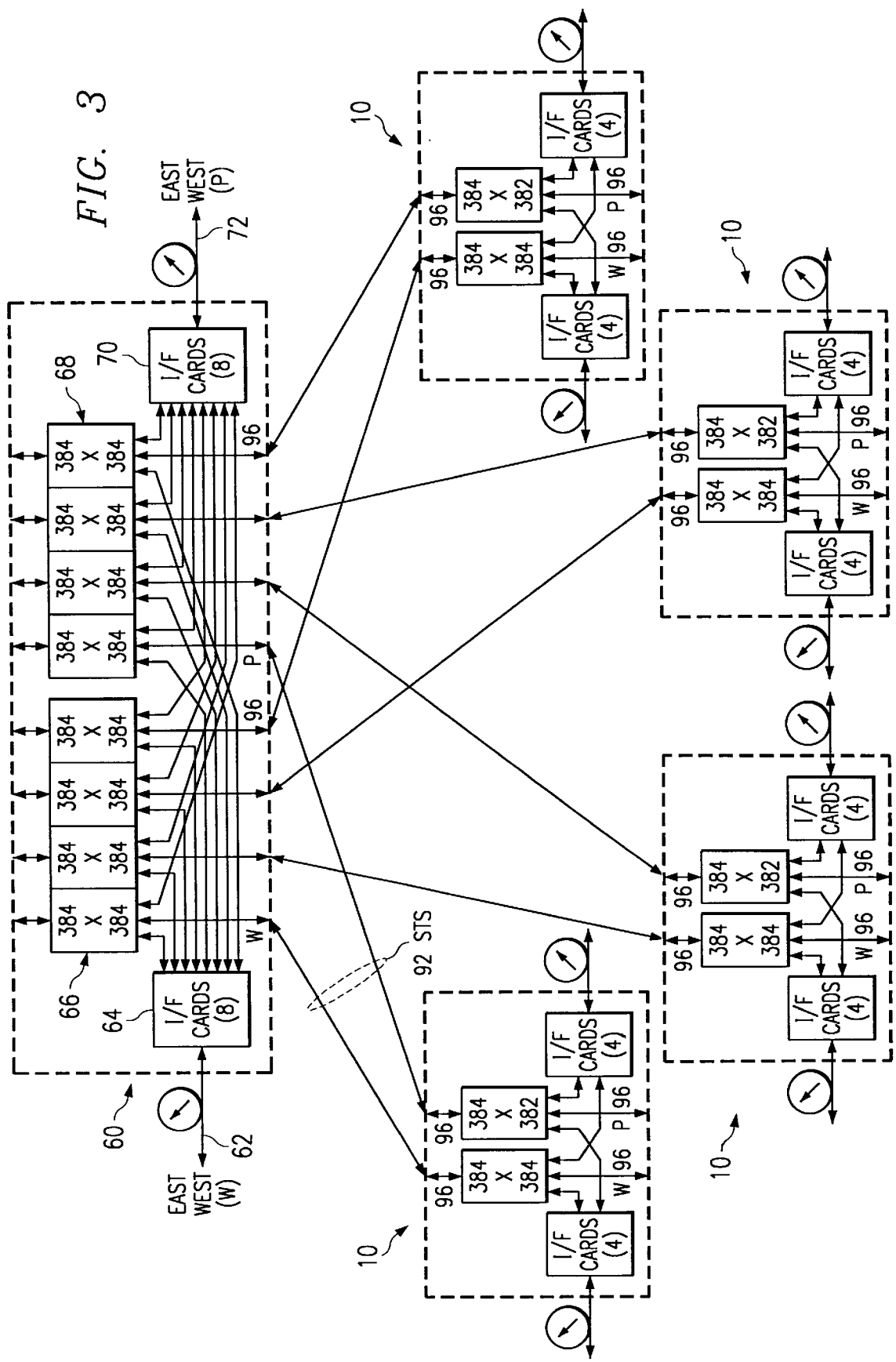
FIG. 3 shows a transmission switch employing the teachings of the present invention, however, with a much larger matrix than the FIG. 2 configuration.

FIG. 3 illustrates further stacking aspects of the present invention in which a plurality of matrix cards connect to form a 1536×1536 matrix configuration 60 that includes two sets of four each 384×384 matrices 66 and 68. The 1536×1536 matrix configuration 60 receives OC192 interfaces 62 and 72 at interface cards 64 and 70, respectively, each providing inputs to four 384×384 matrix arrays 66 and four 384×384 matrix arrays 68. Each 384×384 matrix array 66 and 68 can provide connections to above and below stacked matrix configurations (60, as well as connections to interface cards 64 and 70 on OC-192 interfaces 62 and 72.

Interfaces 62 are working interfaces, interfaces 72 are protect interfaces.

The FIG. 3 configuration 60 uses the 384×384 matrix arrays 66 and 68 at the high-speed OC-192 data rate. FIG. 3 use of eight 384×384 matrices yields a pseudo-1536×1536 matrix. The disadvantage in using 384×384 matrices at this rate is the failure to provide full availability of all of the OC-192 inputs that come from the outside world for connectivity. This is because a blocking condition exists in the matrices. Each of these paths consists of 48 time slots as in FIG. 2. Matrix configuration 60 of FIG. 3, however, splits the 192 time slots into four paths which connect to the four time slot matrices of arrays 66 and 68. In the FIG. 3 embodiment, there is no interconnectivity from the 384×384 matrix array 66 or matrix array 68, however. At least in the way that the configuration of FIG. 3 appears, there is not direct connectivity. However, there are ways to provide improved connectivity, such as taking above paths and daisy-chaining them together. FIG. 3, therefore, shows the equivalent of 192 time slots at each of the interfaces with only 48 time slots in four paths.

Figure 4:
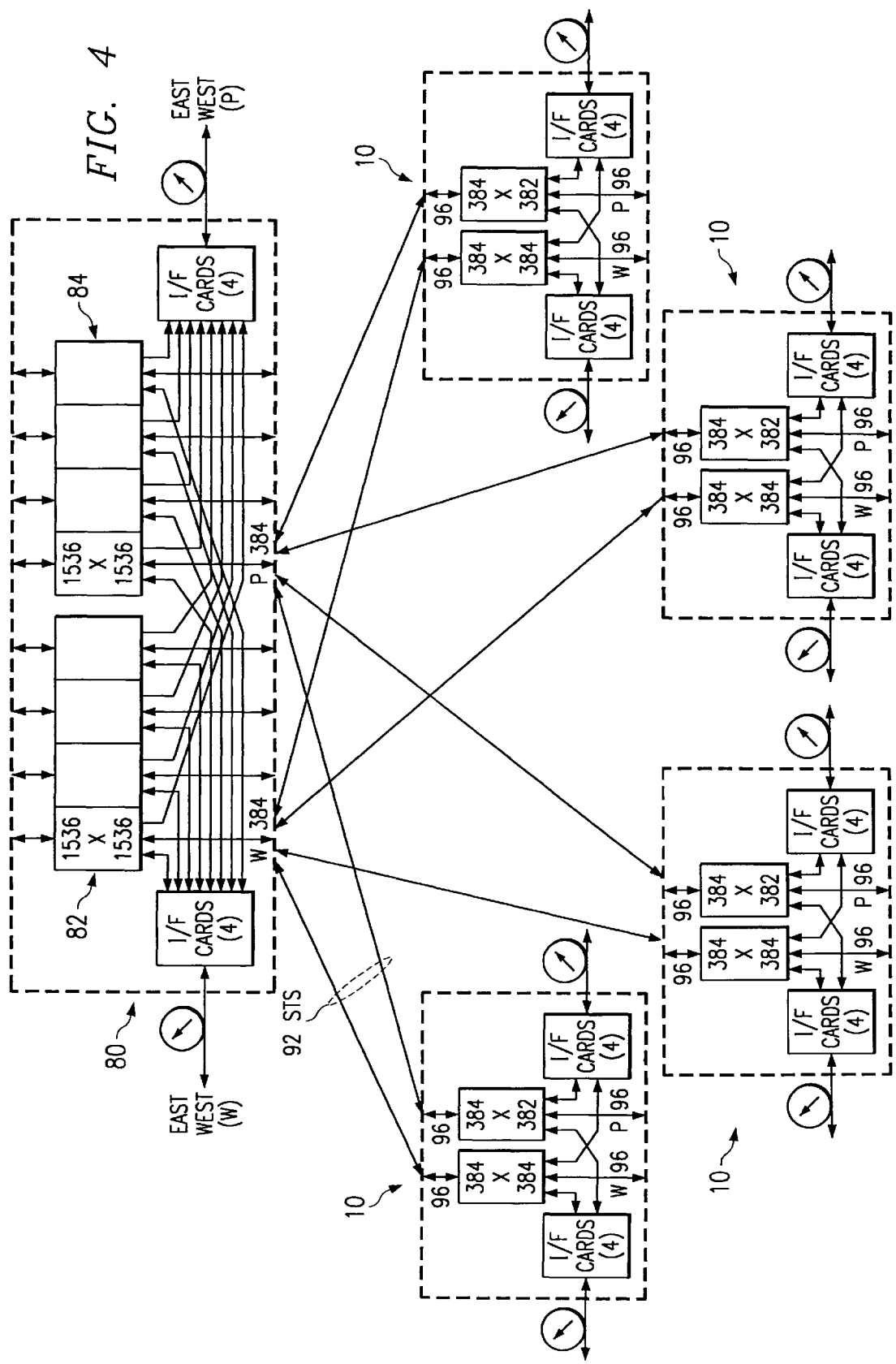
FIG. 4 provides a configuration similar to that of FIG. 3, however, with two 1536 time slot matrices replacing the eight 384 time slot matrices of FIG. 3.

FIG. 4 shows matrix configuration 80, which is quite similar to matrix configuration 60. FIG. 4, however, includes the difference of using a 1536×1536 matrix 82 and a 1536×1536 matrix 84 in the same physical locations as 384×384 arrays 66a and 68a, respectively. In this configuration, space that was occupied by three of the 384×384 matrices of each array 66 and 68 is left vacant. This makes these slots available for other functions if and when they should be desired. In FIG. 4, there is improved connectivity because of the larger matrix. This permits connecting all of the 768 time slot inlet paths through a singular matrix. Here the time slot interfaces between the interface cards and the matrix is increased from 48 time slots to 192 time slots each.

Figure 5:
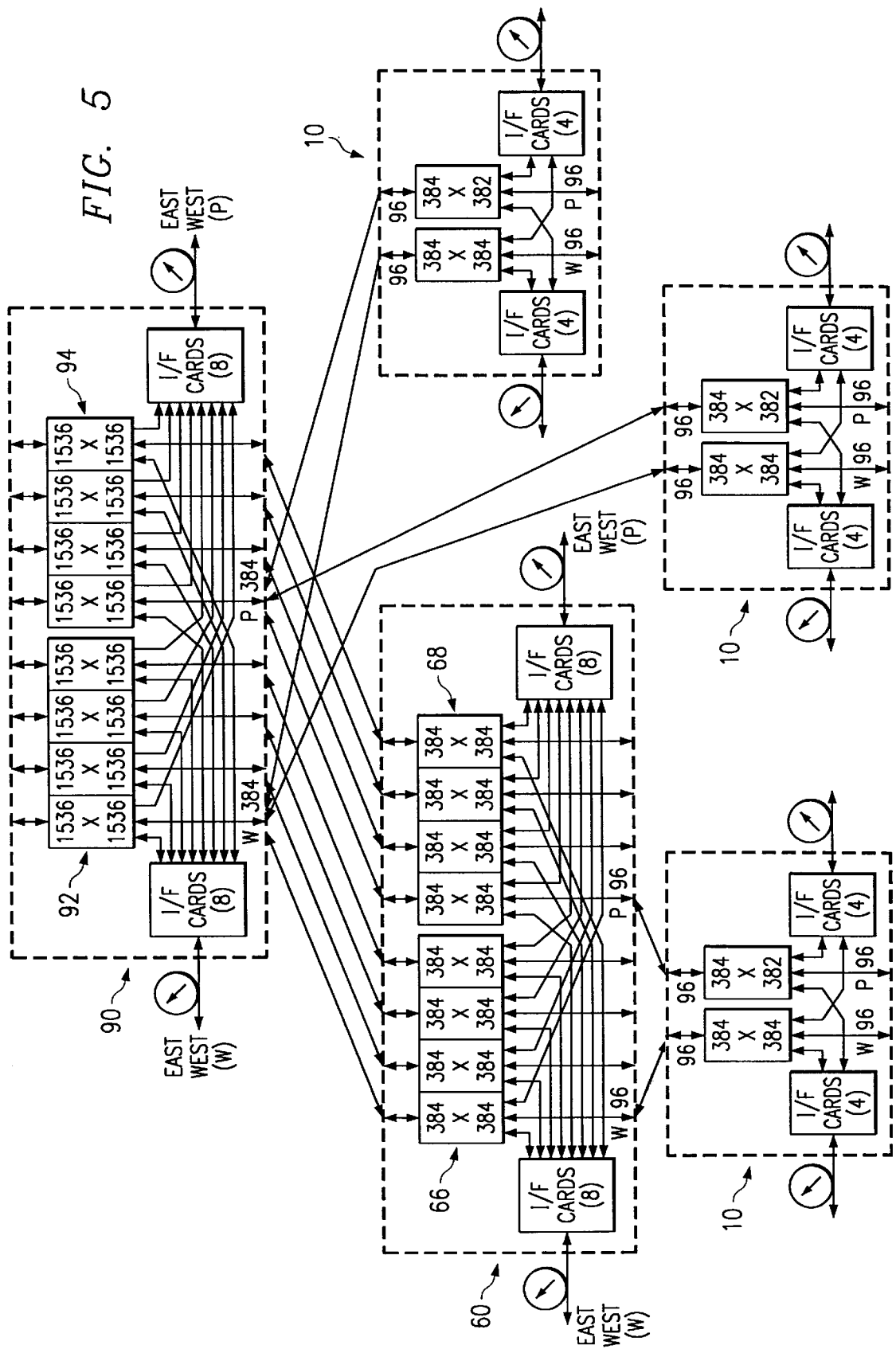
FIG. 5 illustrates another embodiment of the transmission switch architecture of the present invention. Eight 1536 matrices are used to build a larger stacked matrix.

FIG. 5 illustrates yet a further embodiment of the present invention that uses in matrix configuration 90 1536×1536 time slot matrices 92 and 94. FIG. 5 illustrates a higher level of block diagram than FIG. 4. The FIG. 5 configuration differs from those of FIGS. 3 and 4 in that, instead of using eight 384×384 time slot matrices, it uses eight 1536×1536 time slot matrices. FIG. 5 consists of matrices 60 of FIG. 3 or matrices 80 of FIG. 4. Shelf configurations 10 of FIG. 1 are shown connected below shelf configuration 60. This indicates that system growth can be achieved by installing shelves above existing shelves. Therefore, the system grows without affecting existing shelves. It is possible, to use the same physical shelf at the top as well as every chain with which it associates. This makes possible a single-shelf solution and a growth path that grows from an OC-768 interface to an DS-3 interface, for example, as well as any interface level in between.

Figure 6:
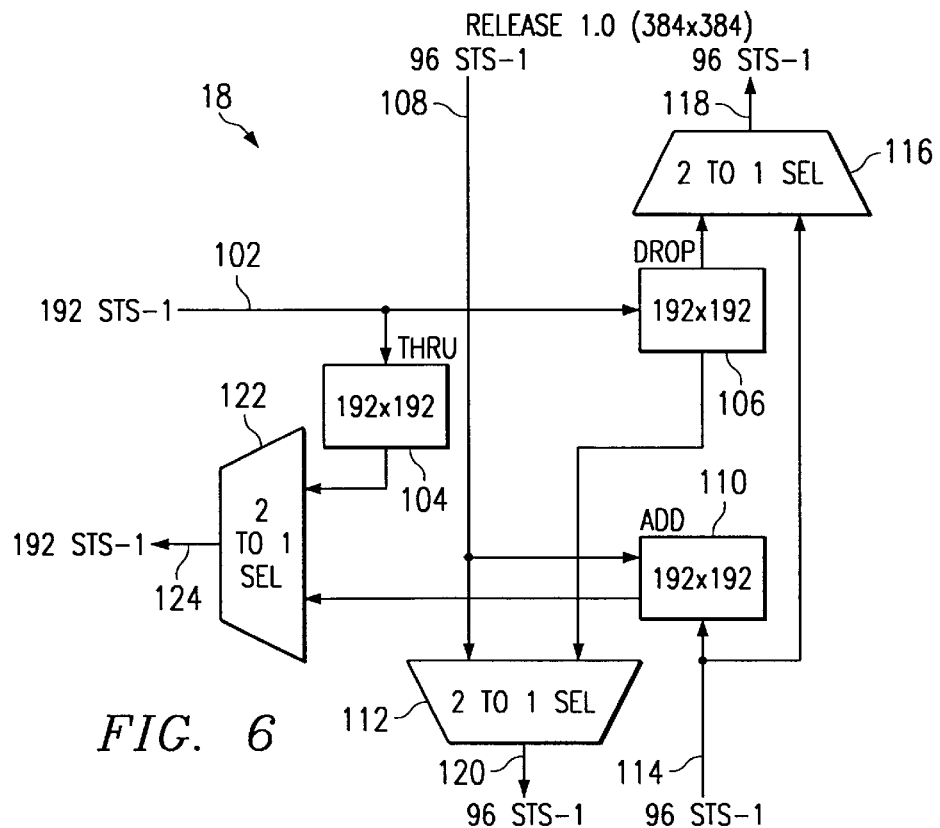
FIG. 6 depicts the implementation for the 384×384 timeslot matrix building block formed according to the teachings of the present invention.

FIG. 6 illustrates the implementation for one of the 384×384 matrices 18 such as time slot matrix 18 appearing in FIG. 1. A set of application specific intergraded circuits (ASICs) make up the 384×384 matrix 18, including a 192×192 time slot switch 104, 06, 110, and a 2 to 12 selector 122, 116, 112. 192 time slots of interface card data enter the 384×384 matrix card at 102. Interface card data exits the 384×384 matrix at outbound 192 time slots 124. These interface time slot busses are further broken down into four 48 time slot groups which connect to the interface cards as described in the FIGURES. The 96 time slot bus 108 comes from an above shelf, the 96 time slot bus 118 goes to a shelf above as described in the FIGURES. The 96 time slot bus 114 comes from a below shelf, the 96 time slot bus 120 goes to a shelf below as described in the FIGURES. The 96 time slot bus 108 connects to the ADD 192×192 time slot switch 110 and the 2 to 12 selector 112. Likewise the time slot bus 114 connects to the ADD 192×192 time slot switch 110 and the 2 to 12 selector 116. The 192 time slot bus 102 connects to the THRU 192×192 time slot switch 104 and the DROP 192×192 time slot switch 106. Selected data for the time slot bus 124 is selected from the output of 192×192 timeslot switch 104 or the output of 192×192 time slot switch 110. Selected data (96 time slots) for the time slot bus 118 is selected from the output of 192×192 timeslot switch 106 or the time slot bus 114. Selected data (96 time slots) for the time slot bus 120 is selected from the output of 192×192 timeslot switch 106 or the time slot bus 108. THRU data is connected from the 192 time slot bus 102 through the THRU 192×192 time slot switch 104 to the time slot bus 124 after the 2 to 1 selector 122. ADD data is connected from the 96 time slot bus 108 or the 96 time slot bus 114 passing through the 192×192 time slot switch 110,selected by the 2 to 1 selector 122 to the time slot bus 124. DROP data is connected to the 96 time slot bus 118 or the 96 time slot bus 120 by the 2 to 12 selectors 116 or 112 respectivly. This data passes through the 192×192 time slot switch 106, from the time slot bus 102.

Figure 7:
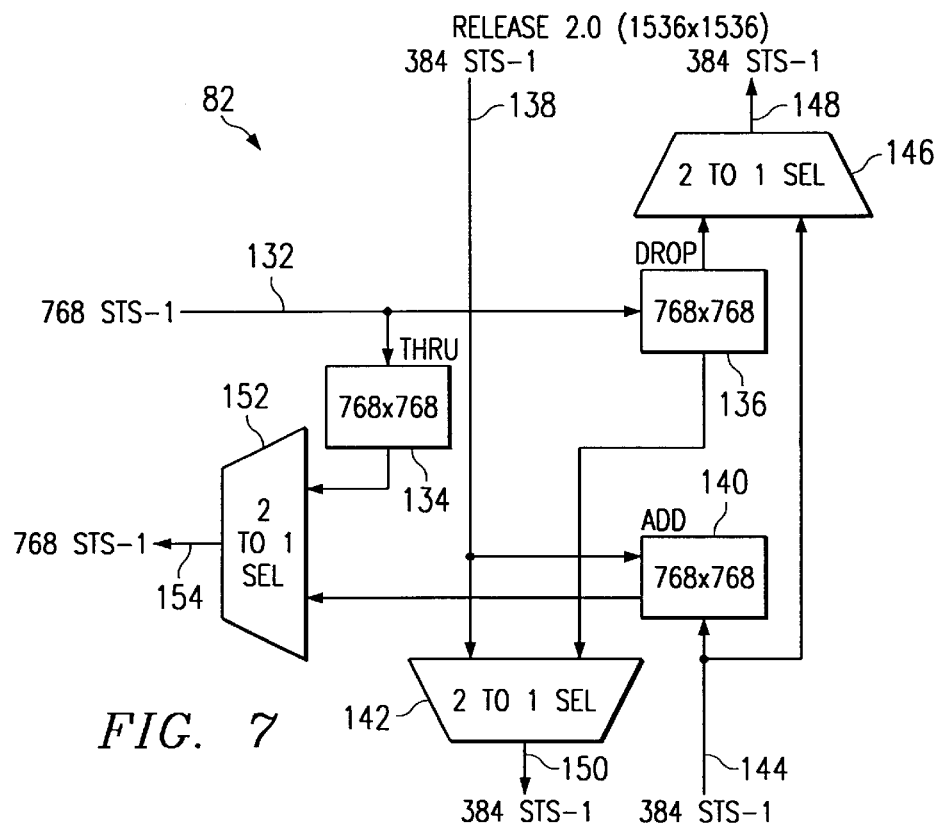
FIG. 7 depicts the implementation for the 1536×1536 time-slot matrix building block formed according to the teachings of the present invention.

ASICs which are unique for the application of the present invention, therefore, include a 192×192 time slot switch ASIC which operates as a cross-connect circuit and a 2-to-1 selector ASIC which operates as a multiplexing selector switch FIG. 7 illustrates the implementation for one of the 1536×1536 matrices 82 such as time slot matrix 82 appearing in FIG. 4. A set of application specific intergraded circuits (ASICs) make up the 1536×1536 matrix 82, including a 768×768 time slot switch 134, 136, 140, and a 2 to 12 selector 152, 146, 142. 768 time slots of interface card data enter the 1536×1536 matrix card at 132. Interface card data exits the 1536×1536 matrix at outbound 768 time slots 154. These interface time slot busses are further broken down into four 192 time slot groups which connect to the interface cards as described in the FIGURES. The 384 time slot bus 138 comes from an above shelf, the 384 time slot bus 148 goes to a shelf above as described in the FIGURES. The 384 time slot bus 144 comes from a below shelf, the 384 time slot bus 150 goes to a shelf below as described in the FIGURES. The 384 time slot bus 138 connects to the ADD 768×768 time slot switch 140 and the 2 to 12 selector 142. Likewise the time slot bus 144 connects to the ADD 768×768 time slot switch 140 and the 2 to 12 selector 146. The 768 time slot bus 132 connects to the THRU 768×768 time slot switch 134 and the DROP 768×768 time slot switch 136. Selected data for the time slot bus 154 is selected from the output of 768×768 time slot switch 134 or the output of 768×768 time slot switch 140. Selected data (384 time slots) for the time slot bus 148 is selected from the output of 768×768 time slot switch 136 or the time slot bus 144. Selected data (384 time slots) for the time slot bus 150 is selected from the output of 768×768 time slot switch 136 or the time slot bus 138. THRU data is connected from the 768 time slot bus 132 through the THRU 768×768 time slot switch 134 to the time slot bus 154 after the 2 to 1 selector 152. ADD data is connected from the 384 time slot bus 138 or the 384 time slot bus 144 passing through the 768×768 time slot switch 140,selected by the 2 to 1 selector 152 to the time slot bus 154. DROP data is connected to the 384 time slot bus 148 or the 384 time slot bus 150 by the 2 to 12 selector 146 or 142 respectivly. This data passes through the 768×768 time slot switch 136, from the time slot bus 132. ASICs which are unique for the application of the present invention, therefore, include a 768×768 time slot switch ASIC which operates as a cross-connect circuit and a 2-to-1 selector ASIC which operates as a multiplexing selector switch.

Although the invention has been described in detail herein with reference to the illustrative embodiments, it is to be understood that this description is by way of example only and is not to be construed in a limiting sense. It is to be further understood, therefore, that numerous changes in the details of the embodiments of the invention and additional embodiments of the invention, will be apparent to, and may be made by, persons of ordinary skill in the art having reference to this description. It is contemplated that all such changes and additional embodiments are within the spirit and true scope of the invention as claimed below.

What is claimed is:

1. A lightwave telecommunications stacked matrix configuration for use in a fiber-optic network comprising;

a first set of interface circuits for interfacing with a first external fiber-optic telecommunications circuit;

a second set of interface circuits for interfacing with a second external fiber-optic telecommunication circuit;

a plurality of time slot matrices associated between said first and second sets of interface circuits for routing lightwave transmissions data within said fiber-optic network; and circuitry associated with said plurality of time slot matrices for communicating above and below said lightwave telecommunications matrix configuration, thereby permitting the stacking of other lightwave telecommunications matrix configurations with said lightwave telecommunications matrix configuration.

2. The lightwave telecommunications matrix configuration of claim 1, wherein each of said time slot matrices further comprises a plurality of cross-connect circuits and a plurality of selector switch circuits.

3. The lightwave telecommunications matrix configuration of claim 2, wherein said plurality of cross-connect circuits further comprises a THRU cross-connect circuit, an ADD cross-connect circuit, and a DROP cross-connect circuit.

4. The lightwave telecommunications matrix configuration of claim 2, wherein each of said plurality of selector circuits associates with at least one of said plurality of cross-connect circuits.

5. The lightwave telecommunications matrix configuration of claim 1, wherein at least one of said time slot matrices comprises a 384×384 time slot matrix.

6. The lightwave telecommunications matrix configuration of claim 1, wherein at least one of said time slot matrices comprises a 1536×1536 time slot matrix.

7. The lightwave telecommunications matrix configuration of claim 1, wherein said plurality of time slot matrices comprises a working matrix and a protect matrix.

* * * * *